United States Patent
Zheng et al.

(10) Patent No.: US 10,162,554 B2
(45) Date of Patent: Dec. 25, 2018

(54) SYSTEM AND METHOD FOR CONTROLLING A PROGRAMMABLE DEDUPLICATION RATIO FOR A MEMORY SYSTEM

(71) Applicant: SAMSUNG ELECTRONICS CO., LTD, Suwon-si, Gyeonggi-do (KR)

(72) Inventors: Hongzhong Zheng, Los Gatos, CA (US); Krishna Malladi, San Jose, CA (US); Dimin Niu, Sunnyvale, CA (US)

(73) Assignee: Samsung Electronics Co., Ltd. (KR)

( * ) Notice: Subject to any disclaimer, the term of this patent is extended or adjusted under 35 U.S.C. 154(b) by 99 days.

(21) Appl. No.: 15/285,437

(22) Filed: Oct. 4, 2016

(65) Prior Publication Data

US 2018/0039443 A1 Feb. 8, 2018

Related U.S. Application Data

(60) Provisional application No. 62/370,655, filed on Aug. 3, 2016.

(51) Int. Cl.
| | |
|---|---|
| *G06F 3/00* | (2006.01) |
| *G06F 3/06* | (2006.01) |
| *G06F 12/1009* | (2016.01) |
| *G06F 13/42* | (2006.01) |

(52) U.S. Cl.
CPC ............ *G06F 3/0641* (2013.01); *G06F 3/065* (2013.01); *G06F 3/0608* (2013.01); *G06F 3/0619* (2013.01); *G06F 3/0683* (2013.01); *G06F 12/1009* (2013.01); *G06F 13/4282* (2013.01); *G06F 2212/1044* (2013.01)

(58) Field of Classification Search
CPC ................................ G06F 3/608; G06F 3/0641
See application file for complete search history.

(56) References Cited

U.S. PATENT DOCUMENTS

| | | | |
|---|---|---|---|
| 6,438,560 | B1 | 8/2002 | Loen |
| 7,650,460 | B2 | 1/2010 | Cheriton |
| 8,065,476 | B2 | 11/2011 | Cheriton |
| 8,230,168 | B2 | 7/2012 | Cheriton |
| 8,504,791 | B2 | 8/2013 | Cheriton |
| 8,612,673 | B2 | 12/2013 | Cheriton |
| 8,688,651 | B2 | 4/2014 | Kennedy et al. |
| 8,825,617 | B2 | 9/2014 | Haas et al. |
| 8,918,605 | B2 | 12/2014 | Aronovich et al. |
| 8,924,663 | B2 | 12/2014 | Szczepkowski et al. |

(Continued)

OTHER PUBLICATIONS

John Peter Stevenson, "Fine-Grain In-Memory Deduplication for Large-Scale Workloads," a dissertation submitted tot eh Department of Electrical Engineering and the Committee on Graduate Studies of Stanford University, Dec. 2013, 140 pages.

(Continued)

*Primary Examiner* — Zachary K Huson
(74) *Attorney, Agent, or Firm* — Innovation Counsel LLP

(57) ABSTRACT

A memory module has a logic including a programming register, a deduplication ratio control logic, and a deduplication engine. The programming register stores a maximum deduplication ratio of the memory module. The control logic is configured to control a deduplication ratio of the memory module according to the maximum deduplication ratio. The deduplication ratio is programmable by the host computer.

16 Claims, 8 Drawing Sheets

(56) References Cited

U.S. PATENT DOCUMENTS

| | | |
|---|---|---|
| 8,930,612 B2 | 1/2015 | Goss et al. |
| 8,938,580 B2 | 1/2015 | Cheriton |
| 9,026,503 B2 | 5/2015 | Sharma et al. |
| 9,075,710 B2 | 7/2015 | Talagala et al. |
| 9,122,407 B2 | 9/2015 | Tsuchiya et al. |
| 9,501,421 B1 | 11/2016 | Cheriton |
| 9,520,193 B2 | 12/2016 | Cheriton |
| 2013/0275699 A1 | 10/2013 | Cheriton |
| 2014/0244599 A1 | 8/2014 | Zhang et al. |
| 2014/0281361 A1 | 9/2014 | Park et al. |
| 2015/0039571 A1 | 2/2015 | Rao et al. |
| 2015/0074339 A1 | 3/2015 | Cheriton |
| 2016/0291891 A1 | 10/2016 | Cheriton |
| 2017/0109049 A1 | 4/2017 | Cheriton |
| 2017/0286004 A1* | 10/2017 | Hu .................... G11C 29/74 |
| 2017/0351453 A1* | 12/2017 | Malladi ............... G06F 3/0604 |

OTHER PUBLICATIONS

Yoongu Kim, "HICAMP: Architectural Support for Efficient Concurrency-Safe Shared Structured Data Access," Cheriton et al., Asplos 2012, Nov. 18, 2013, 43 pages.

David Cheriton, et al., "HICAMP: Architectural Support for Efficient Concurrency-Safe Shared Structured Data Access," Hicamp Systems, Inc., pp. 287-299, Mar. 2012.

\* cited by examiner

SYSTEM AND METHOD FOR CONTROLLING A PROGRAMMABLE DEDUPLICATION RATIO FOR A MEMORY SYSTEM

CROSS-REFERENCE TO RELATED APPLICATION(S)

This application claims the benefits of and priority to U.S. Provisional Patent Application Ser. No. 62/370,655 filed Aug. 3, 2016, the disclosure of which is incorporated herein by reference in its entirety.

TECHNICAL FIELD

The present disclosure relates generally to memory systems, more particularly, to a system and method for controlling a programmable deduplication ratio for a memory system.

BACKGROUND

In the context of memory systems, deduplication refers to a technique for reducing storage needs by eliminating redundant data. Only one unique instance of a data is actually retained on a storage medium, such as a solid-state drive (SSD) and a hard disk drive (HDD). Redundant data is replaced with a pointer to the unique instance of the data.

In-line memory deduplication schemes for a deduplicated memory can provide capacity benefits while reducing the cost-per-bit compared to a non-deduplicated memory. Conventional memory deduplication schemes employ a central processing unit (CPU)-centric approach where a deduplication engine is integrated with a CPU and/or a memory controller (MC) of a host computer. These memory deduplication schemes often use a simple multiple-way hash array for implementing a deduplication algorithm. As a hash array fills up, data can be placed in a non-deduplicated overflow region, reducing deduplication levels. Further, a high deduplication ratio can potentially decrease consumption of the memory components of a deduplicated memory system.

SUMMARY

According to one embodiment, a memory module includes a logic including a programming register, a deduplication ratio control logic, and a deduplication engine. The programming register stores a maximum deduplication ratio of the memory module. The control logic is configured to control a deduplication ratio of the memory module according to the maximum deduplication ratio. The deduplication ratio is programmable by the host computer.

According to another embodiment, a method includes: implementing a logic in a memory module, the logic comprising a programming register, a deduplication ratio control logic, and a deduplication engine; storing a maximum deduplication ratio of the memory module in the programming register; programming a deduplication ratio by the host computer; and controlling the deduplication ratio of the memory module according to the maximum deduplication ratio.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
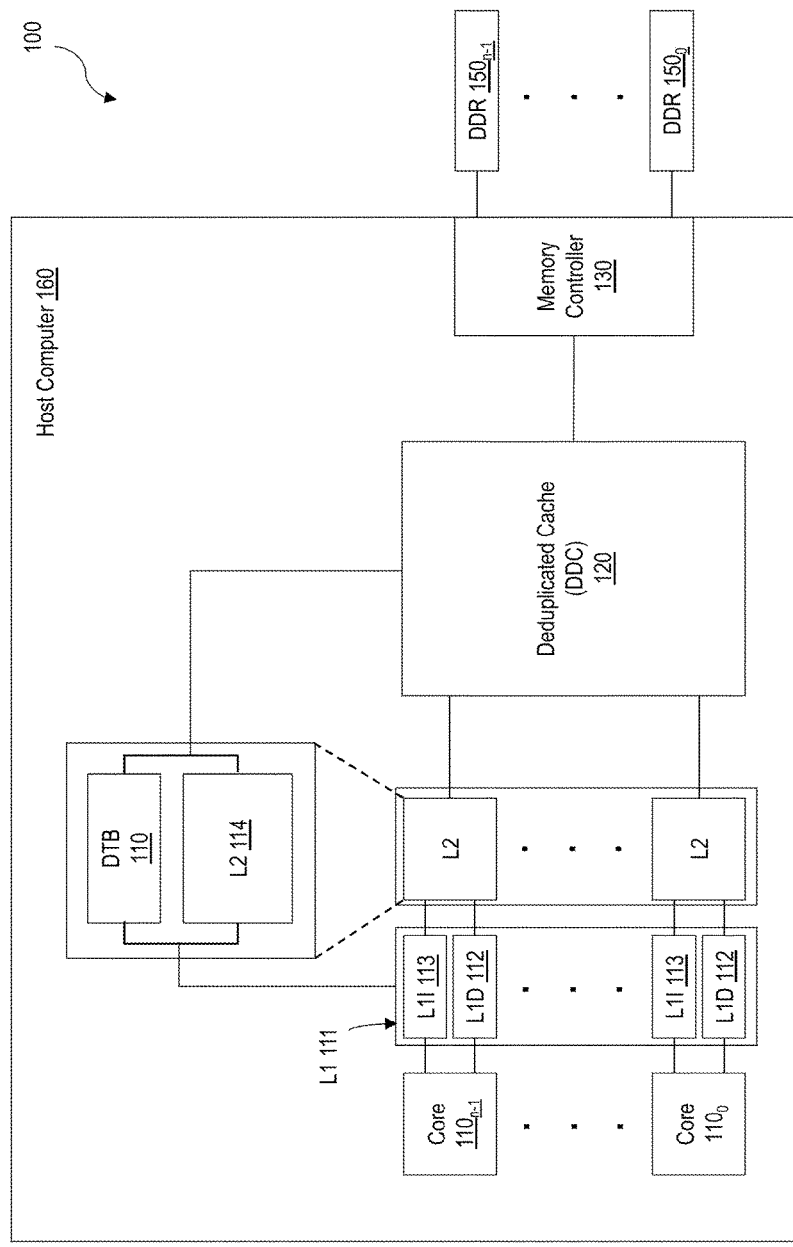
FIG. 1 shows a block diagram of a prior art fine-grained duplication system.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for controlling a programmable deduplication ratio for a memory system. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 shows a block diagram of a prior art duplication system. Details for implementing fine-grained in-memory deduplication is discussed in Ph.D. Dissertation authored by John Peter Stevenson ("Fine-Grain In-Memory Deduplication for Large-Scale Workloads," Stanford University, December 2013).

The deduplication system 100 includes a host computer 160 and a plurality of DDR memory modules $150_0$-$150_{n-1}$. The host computer has a CPU having multicores $110_0$-$110_{n-1}$, a level 1 cache (L1) 111 including a data cache (L1D) 112 and an instruction cache (L1I) 113, a level 2 cache (L2) 114, a direct translation buffer (DTB) 110, a deduplicated cache (DDC) 120, a memory controller 130, and a plurality of memory modules $DDR_0$-$DDR_{n-1}$. The deduplication system 100 can be implemented in a system including a CPU with multiple cores.

The DDC 120 represents a cached version of a deduplicated memory. The DDC 120 exposes the same interface as a normal last level cache (LLC), but can explicitly cache translation lines, data lines, and reference counts. The DDC 120 can reduce the number of memory accesses to the memory modules $DDR_0$-$DDR_{n-1}$. When a specific data cached in the LLC and the value written to a memory module is stale, a read request can be served from the L1 or L2 cache that belongs to the CPU core that has executed the most recent write.

Figure 2:
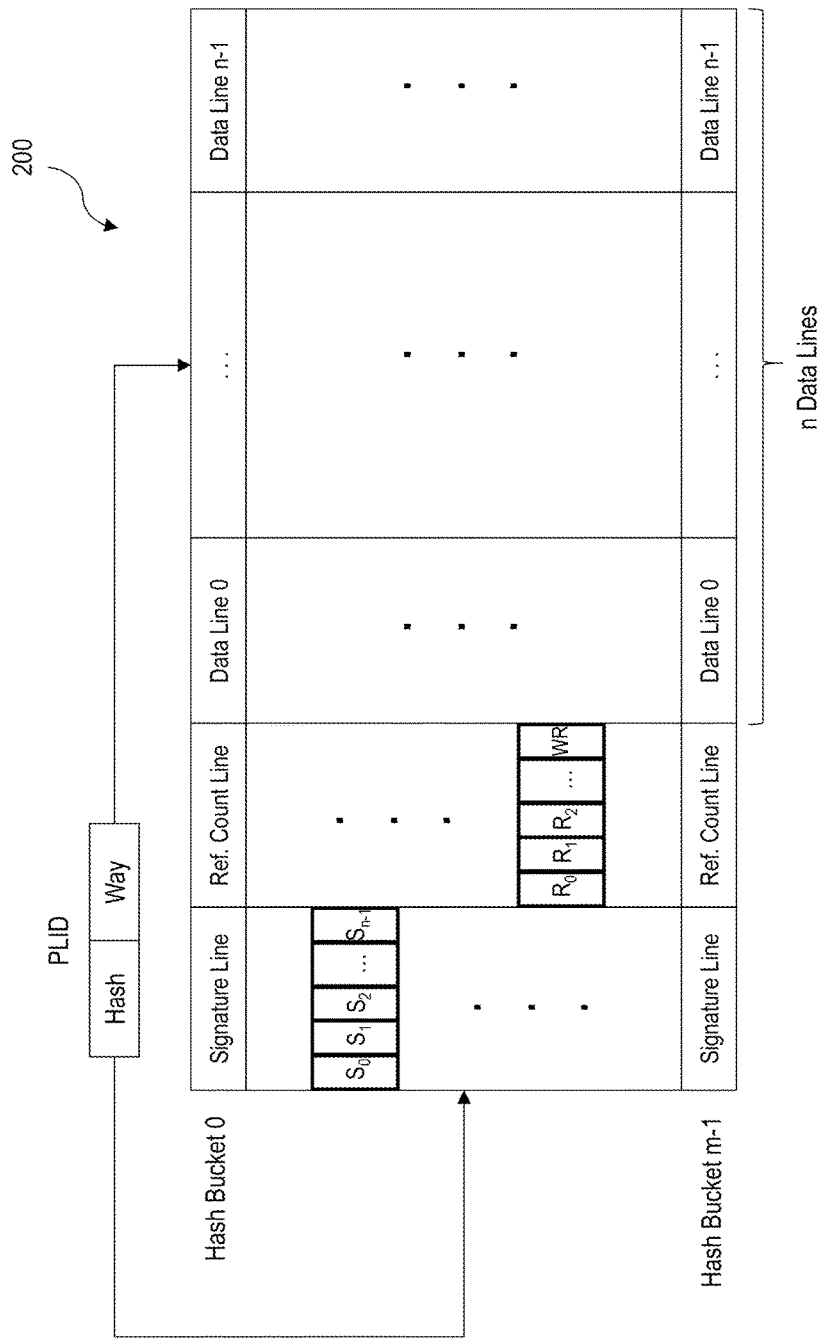
FIG. 2 shows an example hash table used in the deduplication system of FIG. 1.

FIG. 2 shows an example hash table used in the deduplication system of FIG. 1. The hash table 200 includes a hash array including m hash buckets. Each of the hash buckets contains n ways or slots. The term "ways" and "slots" are interchangeably used herein. The hash function h can produce a (log m)-bit hash to index a physical line ID (PLID) into a hash bucket. To insert a line C into the hash array, the value of h(C) is computed, and the row T of h(C) in the hash table is checked to see if a way is available for the insertion of the line C. The total capacity of the hash table 200 is m hash buckets times n data lines as shown in FIG. 2.

Each of the signature and reference count lines can occupy one way in a hash bucket. As a whole, each of the signature lines and the reference count lines of the m hash buckets can occupy an entire column of the hash array. The signature and reference counts may be small enough to pack several quantities into each line. For example, the hash array includes 64 ways, and the signature is 8 bits to fit into a line of 8 bits. In this case, the line of the hash array is 64 bytes (64×8 bits).

In another example, the signature is X bits, the reference count is Y bits, and the physical line of the hash array is 64 bytes. If the number of ways is n, a total of n/(64×8/X) physical lines are needed for each n-way bucket's signature counts. Similarly, n/(64×8/Y) physical lines are needed for each n-way bucket's reference counts. In total, the hash array has n (1+1/(64×8/X)+1/(64×8/Y)) ways. These correspond to the columns in of the hash table provided that all the reference counts and signature lines can be packed for a hash bucket into one line.

In prior art deduplicated memory, the CPU does not have direct access to the physical memory. Instead, a memory controller of the host computer can manage the physical memory, in the present example, as an array of 64-byte memory lines. Each of the physical lines can be identified by its physical line ID (PLID). A PLID is divided into three regions: the translation array, the hash array, and the overflow. The PLID can index into a hash array using the hash function h. For example, the PLID can have the following implementation:

PLID=overflow flag|hash bits|way bits.

The hash bits allow the hash bucket to index into the hash array. The way bits are given a way index. The overflow flag is set to 0 if the data being pointed to is in the hash table 200. If the overflow flag is set to 1, the remaining bits in the PLID are used as an index into the overflow array.

The width of the PLID is determined by the size of the has table 200. For the hash table 200 shown in FIG. 2, log 2 m+log 2 n bits are needed for the hash bits and way bits. With the additional bit for the overflow flag, the width of the PLID is calculated by:

|PLID|=1+log 2m+log 2n.

The present disclosure provides a system and method for providing programmable deduplication ratio control mechanism for a deduplication memory system. The deduplication ratio control mechanism takes a memory-centric approach as opposed to a CPU-centric approach of a conventional deduplication memory system by using a configurable deduplication algorithm to maximize the memory capacity of the deduplication memory system. The deduplication ratio control mechanism can cap the maximum deduplication ratio for various deduplication memory products (e.g., stock keeping units (SKUs)) and configure the deduplication memory products according to a programmed deduplication ratio. Different deduplication ratios may be programmed to the same product depending on intended target applications (e.g., database) for the deduplication memory system.

Figure 3:
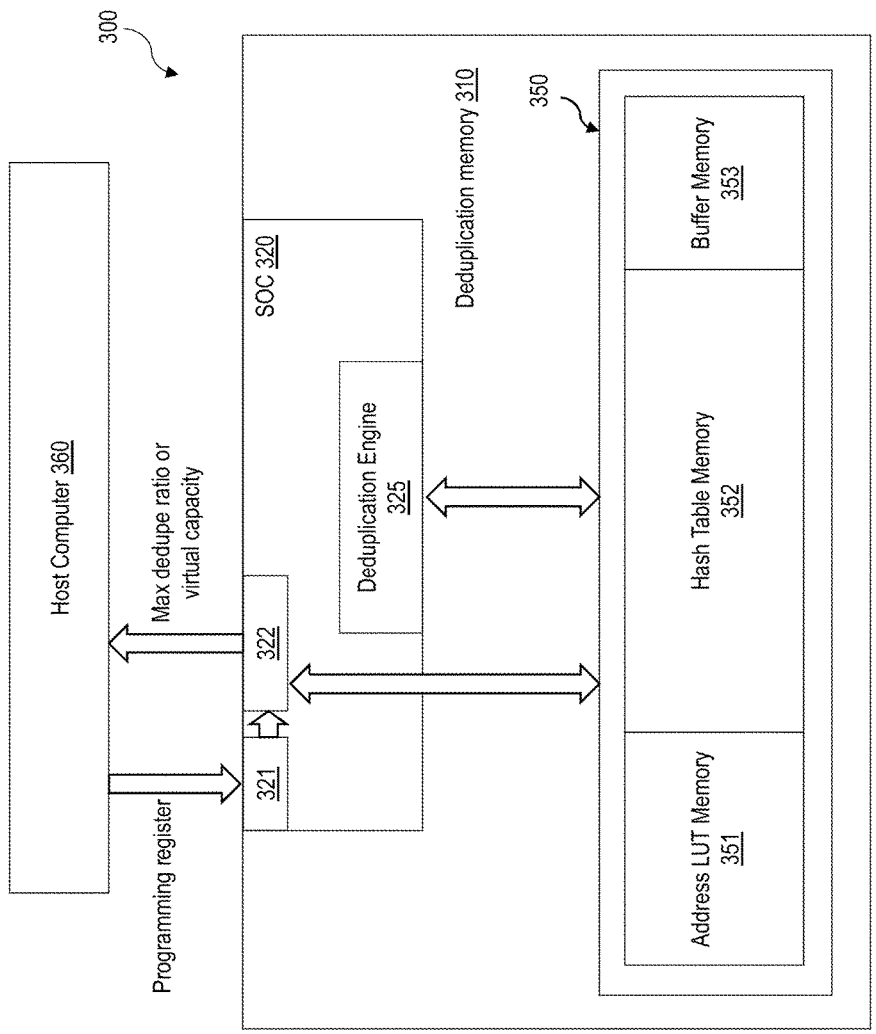
FIG. 3 shows an architecture of an example deduplication memory system, according to one embodiment.

FIG. 3 shows an architecture of an example deduplication memory system, according to one embodiment. The deduplication memory system 300 includes a host computer 360 and a deduplication memory 310. The deduplication memory 310 includes a system-on-chip (SoC) logic 320 that includes a deduplication ratio register 321, a deduplication ratio control logic 322, and an integrated deduplication engine 325. The deduplication ratio register 321 is programmable by a host computer (not shown), and can store a maximum deduplication ratio of the deduplication memory 310. The deduplication ratio register 321 can be programmed by any method of programming including, but not limited to, permanent hardware programming (e.g., setting a fuse) and reading from and writing to an electrically erasable programmable read-only memory (EEPROM). The deduplication ratio register 321 can be programmed during the production of the deduplication memory 310, or at a post-production time according to a system management requirement, for example, during a system boot time.

The deduplication ratio control logic 322 can control a table size of an address lookup table (LUT) to limit the virtual capacity of the deduplication memory 310 according to the programmed maximum deduplication ratio stored in the deduplication ratio register 321. The deduplication ratio control logic 322 can provide the programmed maximum deduplication ratio and/or the virtual capacity of the deduplication memory 310 to an external requestor as well as to the internal deduplication engine 325. In one embodiment, the maximum deduplication ratio is calculated by the physical capacity of the deduplication memory 310 times the deduplication ratio. The deduplication engine 325 can manage read/write requests to the deduplication memory 310 based on the maximum virtual capacity of the deduplication memory 310.

According to one embodiment, the deduplication memory 310 includes a hash table memory 350. The hash table memory 350 includes an address LUT memory (ALUTM) 351, a hash table memory (HTM) 352, and a buffer memory (BM) 353. The address LUT memory (ALUTM) 351 stores mapping information between device address and lookup address. The hash table memory (HTM) 352 stores values in the hash table. The buffer memory (BM) 353 is a reserved memory region to serve as SoC memory buffer/cache and virtual density over-provision management (HTM overflow).

Figure 4:
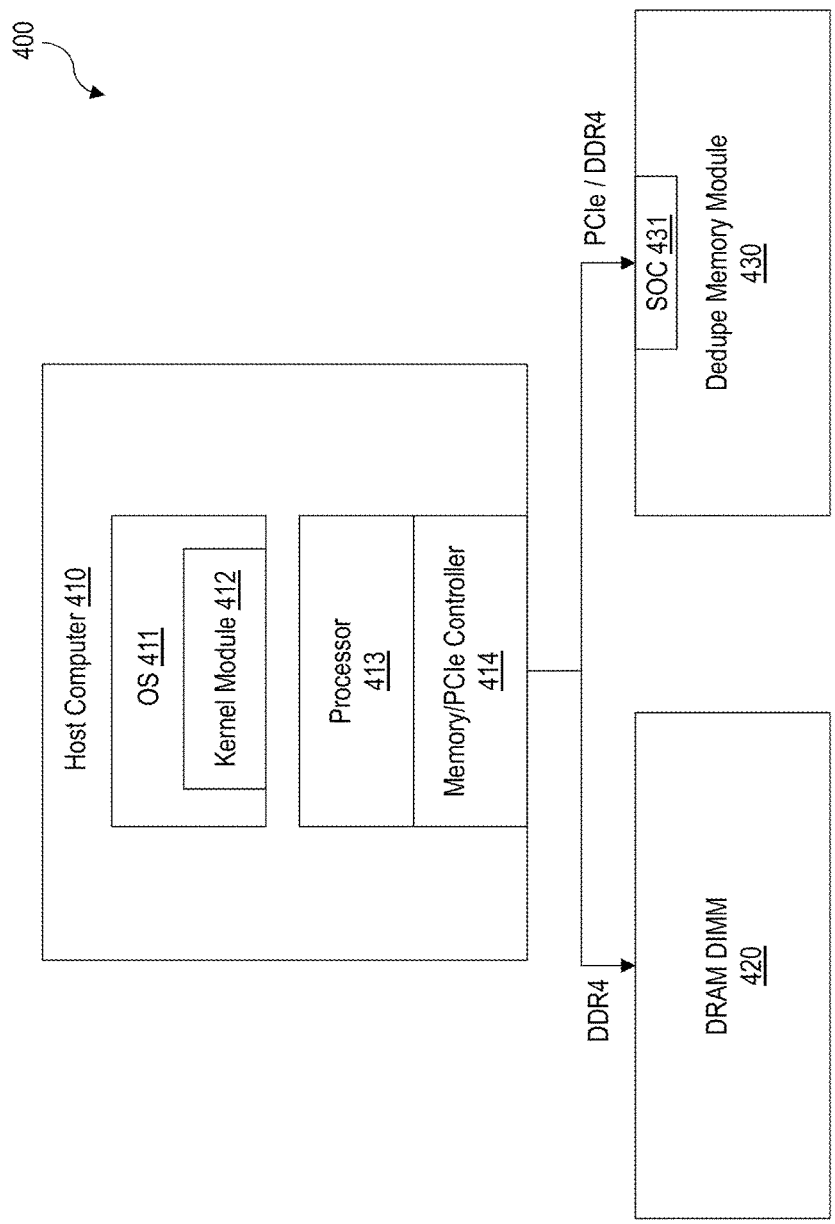
FIG. 4 shows an example deduplication memory system, according to one embodiment.

FIG. 4 shows an example deduplication memory system, according to one embodiment. The deduplication memory system 400 can provide memory-centric data deduplication using a configurable deduplication algorithm to maximize the memory capacity. In the present example, the deduplication memory system 400 includes a host computer 410, a DRAM DIMM 420, and a deduplication memory module 430. The host computer 410 includes a processor 413 that is configured to run an operating system 410 (e.g., Linux) and user applications using a kernel module 411. In addition, the host computer 410 includes one or more memory and interface controllers (collectively referred to as memory/interface controllers 414) to provide support for multiple memory interfaces to the DRAM DIMM 420 and the deduplication memory module 430. The present example shows one DRAM DIMM 420 and one deduplication memory module 430. However, it is understood that the deduplication memory system 400 can include any number of DRAM DIMMs and/or deduplication memory modules without deviating from the scope of the present disclosure.

Each of the DRAM DIMM 420 and the deduplication memory module 430 is coupled to the host computer 410 over a specified interface. For example, The DRAM DIMM 420 is coupled to the host computer 410 over the double data rate (DDR) (e.g., DDR4) memory interface. The deduplication memory module 430 can be coupled to the host computer 410 over the DDR4 memory interface or any other non-memory interfaces such as the peripheral component interconnect express (PCIe) interface, the non-volatile memory express (NVMe), and the NVM over fabrics (NVMf). In one embodiment, the deduplication memory module 430 may be a non-volatile dual in-line memory module NVDIMM including one or more non-volatile memory devices (e.g., flash memory) or at least one non-volatile memory device and one or more DRAM devices.

According to one embodiment, the host computer 410 can have a cache line access to the deduplication memory module 430 over the specified interface (e.g., DDR4, PCIe, etc.). The SoC can provide over provisioned memory capacity (i.e., virtual memory capacity) of the deduplication memory module 430 to the host computer. Due to the deduplicated data stored in the deduplication memory module 430, the virtual memory capacity of the deduplication memory module 430 can be larger than its physical memory capacity. The SoC 431 of the deduplication memory module 430 can provide intelligent features to the host computer 410 such as data deduplication, addressable data, security, processing-in-memory (PIM), and a rasterization processing (RAS). In addition, the SoC 431 can provide virtual density management and efficient data placement as well as a DRAM interface (e.g., DDR4). The deduplication memory module 430 can have a variety of form factors including, but not limited to, DIMM, 2.5 in hard drive, full height, half length (FHHL), half height, half length (HHHL), and full height, full length (FHFL).

Figure 5:
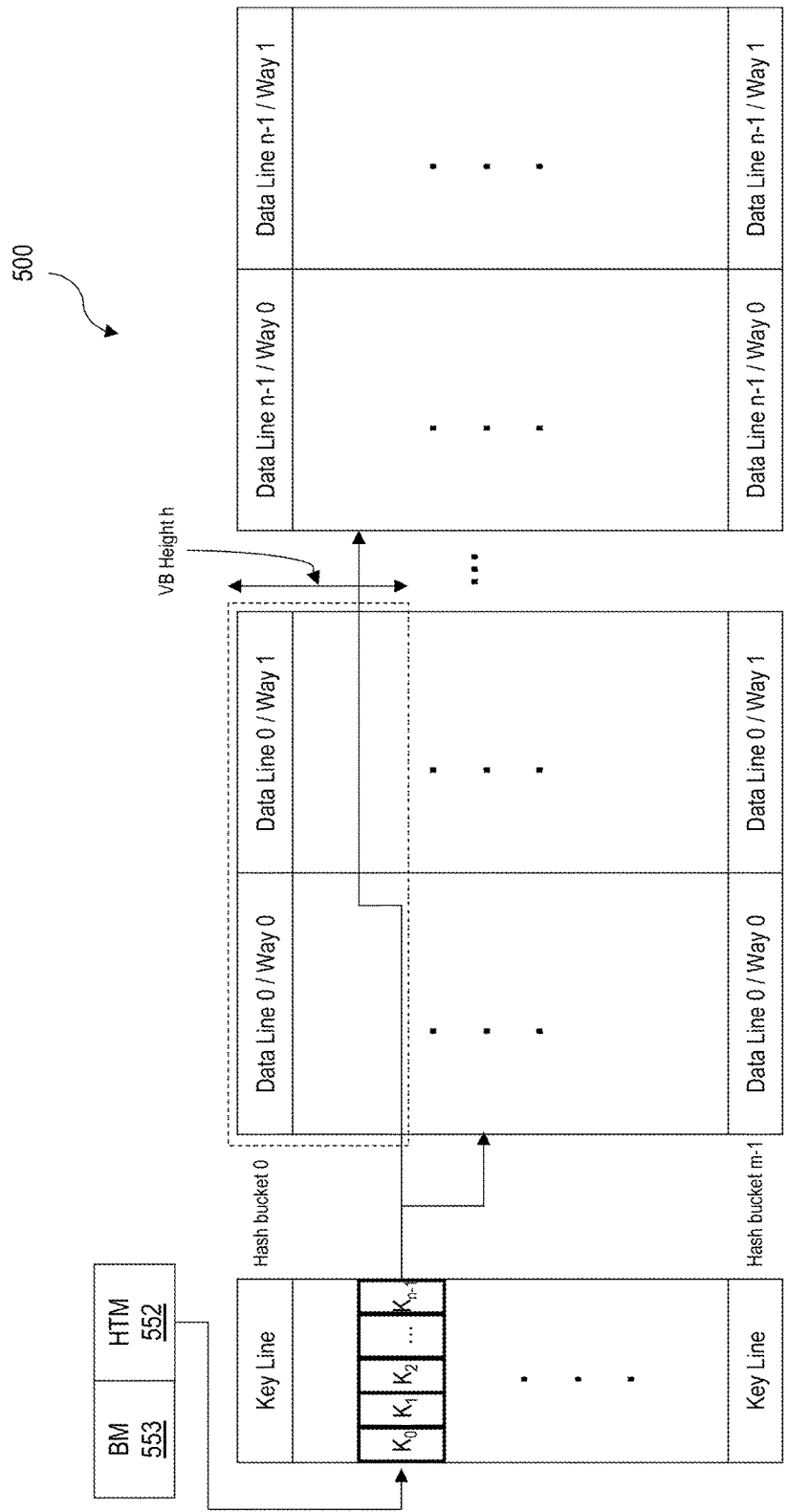
FIG. 5 shows a hash table used in an example deduplication system, according to one embodiment.

FIG. 5 shows an example hash table memory, according to one embodiment. The hash table memory (HTM) 500 includes 3D data including m hash buckets, n hash functions, and d ways for each hash function. A virtual bucket (VB) allows data placement in near-location hash buckets, for example, within the VB height h of the hash buckets. For each hash bucket, there is one associated hash function h(x) that produces a log 2(m)-bit hash to index data into the hash buckets. For example, if the hash table has 8 hash buckets, then the hash function of that hash table produces a 3-bit hash. That is, the hash function h(x) allows a relatively large amount of input data (e.g., an input data file to be stored in memory) to be input into the hash function h(x), and a substantially different smaller amount of output data (e.g., the hash value) is generated and output by the hash function h(x) to be stored in the hash table. Accordingly, the hash function h(x) enables compression, as different data sets may occasionally hash to a same hash value.

Figure 6:
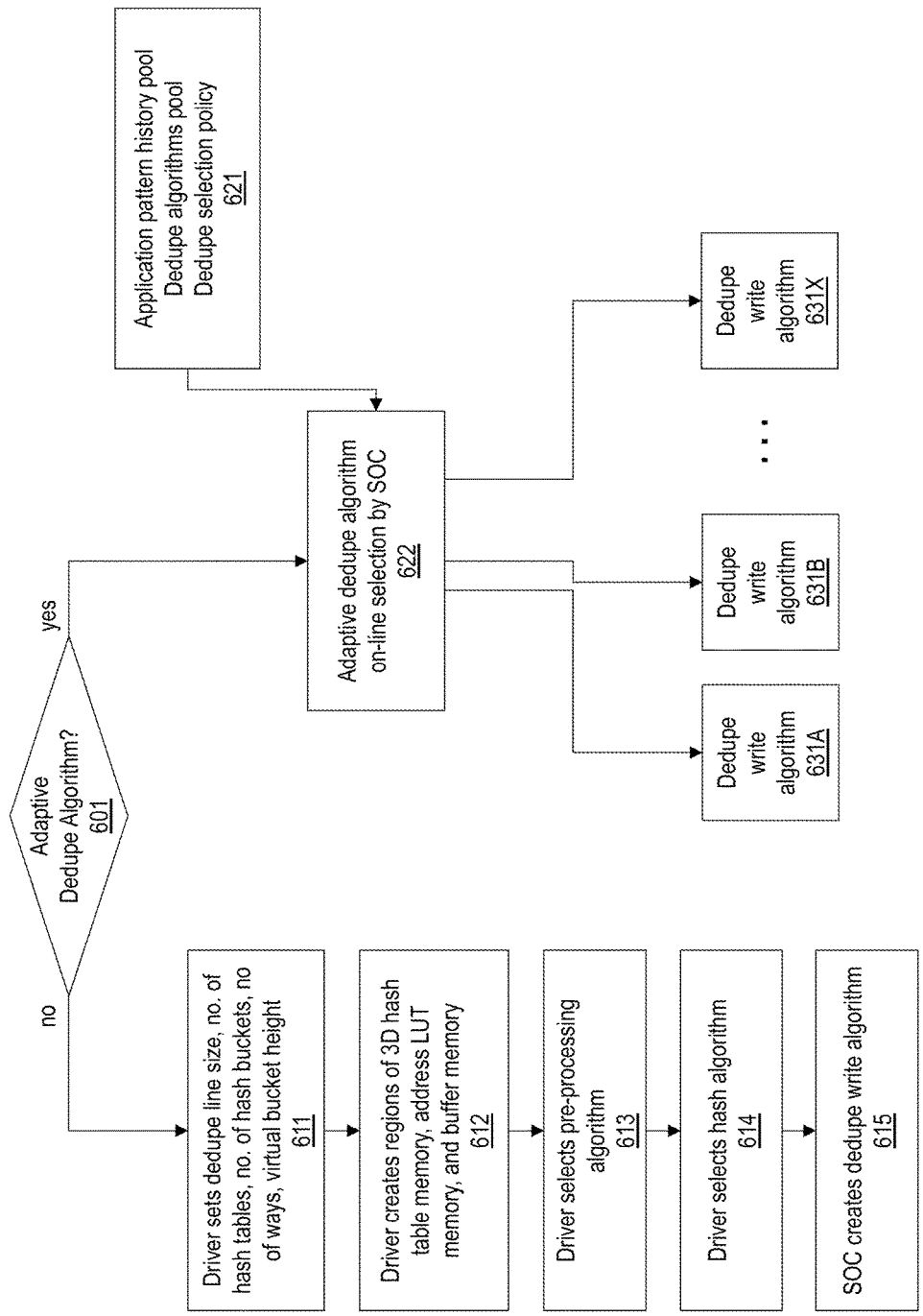
FIG. 6 shows a flow chart for an example deduplication write process, according to one embodiment.

FIG. 6 shows a flow chart for an example deduplication write process, according to one embodiment. A deduplication engine of a deduplication memory can determine whether to employ a non-adaptive deduplication algorithm or an adaptive deduplication algorithm (601). For the non-adaptive deduplication algorithm, the software running on a host computer can define the deduplication algorithm. For the adaptive deduplication algorithm, the deduplication engine of the deduplication memory can define the deduplication algorithm based on various parameters, for example, the application history, and a selection policy.

When the non-adaptive deduplication algorithm is selected, the driver for the deduplication memory that is loaded into the kernel of the host OS sets the deduplication line size, the numbers of hash tables, hash buckets, the number of ways, a virtual bucket height (611). The SoC creates regions of a hash table memory, an address LUT memory, and a buffer memory as shown in FIG. 3 (612). The driver selects a pre-processing algorithm (613) and selects a hash algorithm (614). The SoC of the deduplication memory creates a deduplication write algorithm (615).

When the adaptive deduplication algorithm is selected, the SoC of the deduplication memory selects an adaptive deduplication algorithm online (622). When selecting the adaptive deduplication algorithm, the SoC refers to various parameters, for example, application pattern history pool, deduplication algorithms pool and deduplication selection policy (621). The SoC can apply different deduplication write algorithms 631A-631X. Different algorithms can be selected by the SoC at a boot time for different memory regions. The selected algorithms may be changed until the next boot time.

Figure 7:
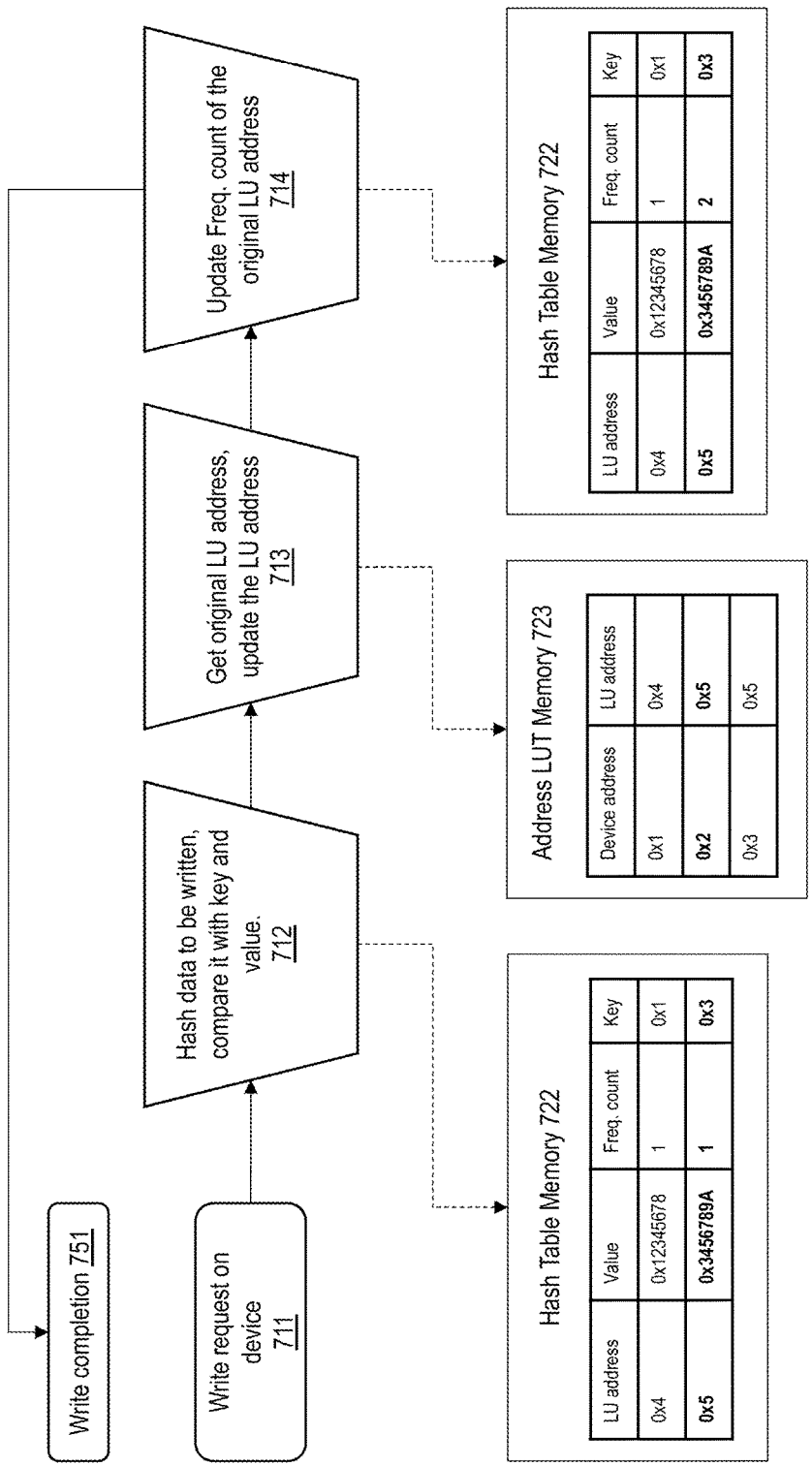
FIG. 7 shows an example flowchart for a deduplication memory system write process, according to one embodiment.

FIG. 7 shows an example flowchart for a deduplication memory system write process, according to one embodiment. A write request arrives at the deduplication memory over a specified interface (e.g., DDR4 and PCIe) (711). For example, the write request is to write data 0x3456789A to the device address 0x2. The deduplication engine implemented in the SoC of the deduplication memory hashes the data to be written from the write request. In this example, the hashed data has the lookup (LU) address 0x5 and the key 0x3. The deduplication engine compares the hashed LU address 0x5 and the key 0x3 with a key and a value stored in the hash table memory 722 (712). If a matching value is found in the hash table memory 722, the deduplication engine increases the frequency count for the matching entry from 1 to 2. The frequency count is a reference count indicating how many PLIDs in the address lookup translation array point to a particular line. The deduplication engine gets the original LU address (e.g., 0x5) and updates the LU address in the address LUT memory 723 (713). The deduplication engine updates the frequency count of the original LU address (e.g., 0x5) in the hash table memory 722 (714). If no matching entry is found in the hash table memory 722, the deduplication engine adds a new entry with a frequency 1 in both the hash table memory 722 and the address LUT memory 723. The deduplication engine reports to the host memory controller that the write request is completed (751).

Figure 8:
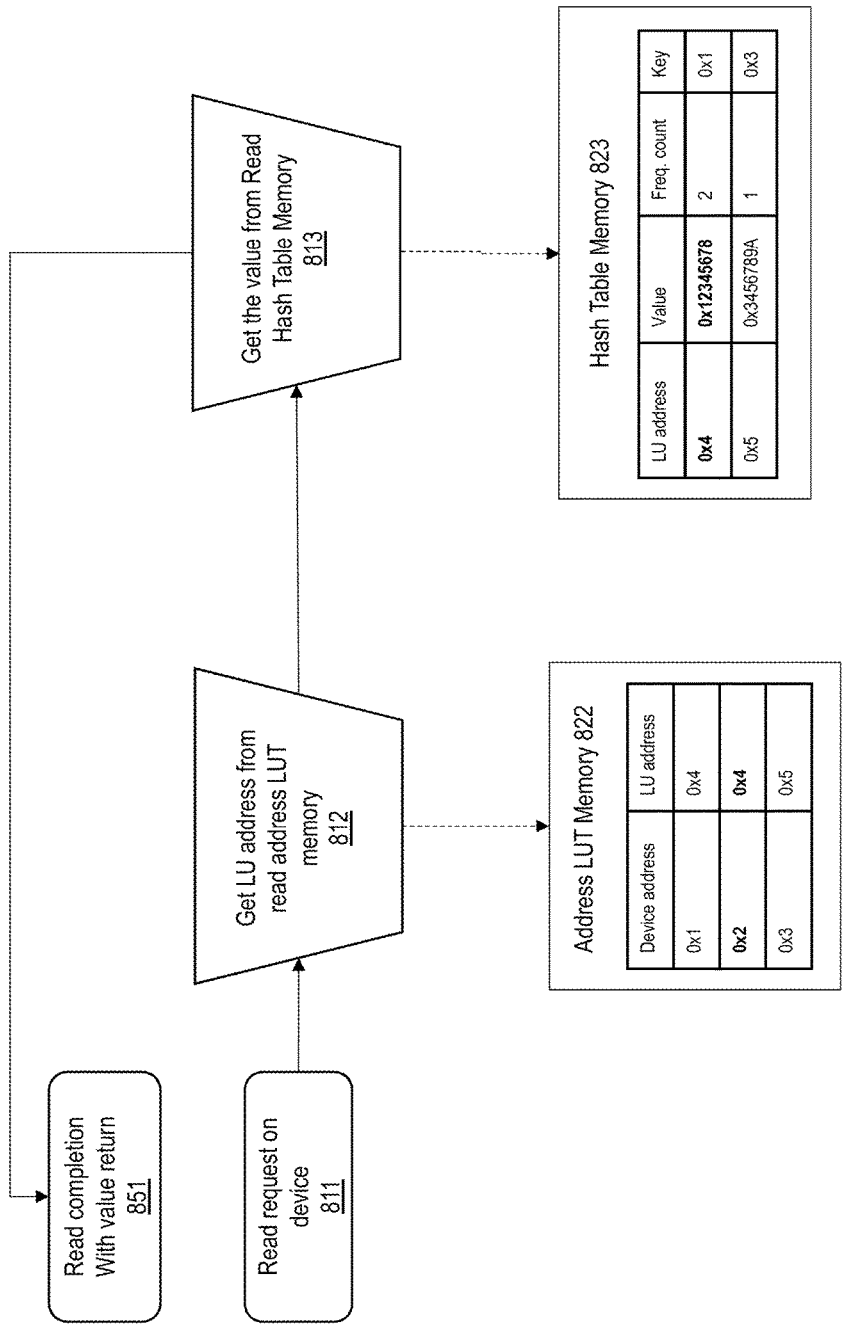
FIG. 8 shows an example flowchart for a deduplication memory system read process, according to one embodiment.

FIG. 8 shows an example flowchart for a deduplication memory system read process, according to one embodiment. A read request arrives at the deduplication memory over a specified interface (e.g., DDR4 and PCIe) (811). For example, the read request is to device address 0x2. The device address refers the address of the data to be read, and the LU address refers to the actual location of the data stored in the hash table memory 823. The deduplication engine gets the LU address from the read address LUT memory 822 (812). The deduplication engine gets the value (0x12345678) that corresponds to the LU address 0x4 from the read hash table memory 823 (813). The deduplication engine sends the read data to the host memory controller to complete the read request (851).

According to one embodiment, a memory module includes a logic including a programming register, a deduplication ratio control logic, and a deduplication engine. The programming register stores a maximum deduplication ratio of the memory module. The control logic is configured to control a deduplication ratio of the memory module according to the maximum deduplication ratio. The deduplication ratio is programmable by the host computer.

The control logic may be further configured to communicate the deduplication ratio of the memory module to the host computer via the host interface.

The deduplication ratio of the memory module may be programmed at production of the memory module.

The deduplication ratio of the memory module may be programmed at a system boot time.

The memory module may further include a hash table memory. The hash table memory may include an address lookup table (LUT), a hash table, and a buffer memory.

The deduplication ratio control logic may be configured to control a table size of the address lookup table to limit a virtual capacity of the deduplication memory module according to the programmed deduplication ratio stored in the deduplication ratio register.

The host interface may be a double data rate (DDR) interface.

The host interface may be a peripheral component interconnect express (PCIe) interface.

According to another embodiment, a method includes: implementing a logic in a memory module, the logic comprising a programming register, a deduplication ratio control logic, and a deduplication engine; storing a maximum deduplication ratio of the memory module in the programming register; programming a deduplication ratio by the host computer; and controlling the deduplication ratio of the memory module according to the maximum deduplication ratio.

The method may further include communicating the deduplication ratio of the memory module to a host computer via a host interface.

The deduplication ratio of the memory module may be programmed at production of the memory module.

The deduplication ratio of the memory module may be programmed at a system boot time.

The method may further include providing a hash table memory including an address lookup table (LUT), a hash table, and a buffer memory.

The method may further include controlling a table size of the address lookup table to limit a virtual capacity of the deduplication memory module according to the programmed deduplication ratio stored in the deduplication ratio register.

The host interface may be a double data rate (DDR) interface.

The host interface may be a peripheral component interconnect express (PCIe) interface.

The above example embodiments have been described hereinabove to illustrate various embodiments of implementing a system and method for providing a system and method for controlling a programmable deduplication ratio for a memory system. Various modifications and departures from the disclosed example embodiments will occur to those having ordinary skill in the art. The subject matter that is intended to be within the scope of the invention is set forth in the following claims.

What is claimed is:

1. A memory module comprising:
a logic comprising a programming register, a deduplication ratio control logic, and a deduplication engine; and
a host interface to a host computer,
wherein the programming register stores a maximum deduplication ratio of the memory module,
wherein the control logic is configured to control a deduplication ratio of the memory module according to the maximum deduplication ratio, and
wherein the deduplication ratio is programmable by the host computer.

2. The memory module of claim 1, wherein the control logic is further configured to communicate the deduplication ratio of the memory module to the host computer via the host interface.

3. The memory module of claim 1, wherein the deduplication ratio of the memory module is programmed at production of the memory module.

4. The memory module of claim 1, wherein the deduplication ratio of the memory module is programmed at a system boot time.

5. The memory module of claim 1, further comprising a hash table memory, wherein the hash table memory comprises an address lookup table (LUT), a hash table, and a buffer memory.

6. The memory module of claim 5, wherein the deduplication ratio control logic is configured to control a table size of the address lookup table to limit a virtual capacity of the deduplication memory module according to the programmed deduplication ratio stored in the deduplication ratio register.

7. The memory module of claim 1, wherein the host interface is a double data rate (DDR) interface.

8. The memory module of claim 1, wherein the host interface is a peripheral component interconnect express (PCIe) interface.

9. A method comprising:
implementing a logic in a memory module, the logic comprising a programming register, a deduplication ratio control logic, and a deduplication engine;
storing a maximum deduplication ratio of the memory module in the programming register;
programming a deduplication ratio by the host computer; and
controlling the deduplication ratio of the memory module according to the maximum deduplication ratio.

10. The method of claim 9, further comprising communicating the deduplication ratio of the memory module to a host computer via a host interface.

11. The method of claim 9, wherein the deduplication ratio of the memory module is programmed at production of the memory module.

12. The method of claim 9, wherein the deduplication ratio of the memory module is programmed at a system boot time.

13. The method of claim 9, further comprising providing a hash table memory including an address lookup table (LUT), a hash table, and a buffer memory.

14. The method of claim 13, further comprising controlling a table size of the address lookup table to limit a virtual capacity of the deduplication memory module according to the programmed deduplication ratio stored in the deduplication ratio register.

15. The method of claim 11, wherein the host interface is a double data rate (DDR) interface.

16. The method of claim 11, wherein the host interface is a peripheral component interconnect express (PCIe) interface.

* * * * *

UNITED STATES PATENT AND TRADEMARK OFFICE
CERTIFICATE OF CORRECTION

PATENT NO. : 10,162,554 B2
APPLICATION NO. : 15/285437
DATED : December 25, 2018
INVENTOR(S) : Zheng et al.

Page 1 of 1

It is certified that error appears in the above-identified patent and that said Letters Patent is hereby corrected as shown below:

In the Claims

Column 9, In Claim 1, Line 7, please change "control logic" to --deduplication ratio control logic--

Column 9, In Claim 2, Lines 1-2, please change "control logic" to --deduplication ratio control logic--

Column 9, In Claim 6, Lines 5-6, please change "deduplication ratio register" to --programming register--

Column 10, In Claim 14, Lines 4-5, please change "deduplication ratio register" to --programming register--

Signed and Sealed this
Ninth Day of July, 2019

Andrei Iancu
*Director of the United States Patent and Trademark Office*